(12) United States Patent
Rao et al.

(10) Patent No.: US 10,409,832 B2
(45) Date of Patent: Sep. 10, 2019

(54) PROBING LINEAR AND NON-LINEAR RELATIONSHIPS BETWEEN ENTITIES IN A NETWORK

(71) Applicant: SAP SE, Walldorf (DE)

(72) Inventors: Santhosh Rao, Bangalore (IN); Jaison Jacob, Kollam (IN); Gonda Marcusse, Walldorf (DE); Naveed Mohammed, Bangalore (IN); Vishnu Kare, Kurnool (IN); Ismail Basha, Bangalore (IN); Apoorv Bhargava, Bangalore (IN)

(73) Assignee: SAP SE, Walldorf (DE)

( * ) Notice: Subject to any disclaimer, the term of this patent is extended or adjusted under 35 U.S.C. 154(b) by 163 days.

(21) Appl. No.: 15/620,796

(22) Filed: Jun. 12, 2017

(65) Prior Publication Data
US 2018/0356944 A1   Dec. 13, 2018

(51) Int. Cl.
*G06F 16/25* (2019.01)
*G06F 17/24* (2006.01)
*G06F 16/904* (2019.01)
*G06F 16/909* (2019.01)

(52) U.S. Cl.
CPC .......... *G06F 16/252* (2019.01); *G06F 16/904* (2019.01); *G06F 16/909* (2019.01); *G06F 17/245* (2013.01)

(58) Field of Classification Search
CPC .............................. G06F 3/0482; G06F 16/252
USPC ....................................................... 715/739
See application file for complete search history.

(56) References Cited

U.S. PATENT DOCUMENTS

| | | | |
|---|---|---|---|
| 6,982,708 B1 | 1/2006 | Mah et al. | |
| 7,617,185 B2 | 11/2009 | Werner et al. | |
| 8,612,443 B2 | 12/2013 | Werner | |
| 9,411,899 B2* | 8/2016 | Godsey | G06F 3/0481 |
| 9,466,138 B2 | 10/2016 | Singh et al. | |
| 2004/0017404 A1 | 1/2004 | Schileru | |
| 2004/0150644 A1 | 8/2004 | Kincaid et al. | |
| 2009/0216728 A1* | 8/2009 | Brainerd | G06F 16/248 |
| 2011/0179390 A1 | 7/2011 | Morris | |
| 2014/0181699 A1* | 6/2014 | Godsey | G06F 3/0481 715/760 |
| 2015/0269383 A1* | 9/2015 | Lang | G06F 21/57 726/1 |
| 2016/0162566 A1* | 6/2016 | Hanis | G06F 16/245 707/737 |
| 2017/0140262 A1* | 5/2017 | Wilson | H04L 67/42 |
| 2017/0293697 A1* | 10/2017 | Youshi | G06F 16/9024 |

(Continued)

*Primary Examiner* — William D Titcomb
(74) *Attorney, Agent, or Firm* — Fish & Richardson P.C.

(57) ABSTRACT

To probe linear and non-linear relationships of entities in a network, in a graphical user interface, in a login session, a selection of an action on a first node is received. In response to the selection of the action on the first node, the action is automatically performed. A navigation breadcrumb is dynamically generated in the graphical user interface with a first navigation identifier corresponding to the action performed on the first node and a corresponding first state information of the nodes. In database tables in a database, the first state information of the nodes corresponding to the first navigation identifier is stored. Selection of the first navigation identifier on the navigation breadcrumb is received, and in response to the selection, the first state information of the nodes is retrieved from the database tables and displayed in a canvas in an area of focus.

20 Claims, 11 Drawing Sheets

(56) References Cited

U.S. PATENT DOCUMENTS

| | | | |
|---|---|---|---|
| 2017/0357890 A1* | 12/2017 | Kim | G06N 3/0454 |
| 2018/0005121 A1* | 1/2018 | Hoque | G06N 5/04 |
| 2018/0060747 A1* | 3/2018 | Ghosh | H04L 67/306 |
| 2018/0082240 A1* | 3/2018 | Meyerzon | G06Q 10/063112 |
| 2018/0101613 A1* | 4/2018 | Bastide | G06F 17/21 |

* cited by examiner

INVESTIGATION MANAGEMENT APPLICATION

INVESTIGATION CASE: CASE ID 1245A 102

LOCATIONS 106:

| LOCATION | ADDRESS |
|---|---|
| LOCATION A 108 | DEF 110 |
| LOCATION B 112 | BGH 114 |

PEOPLE 116:

| NAME | RELATIONSHIP |
|---|---|
| PERSON A 118 | WITNESS 120 |
| PERSON B 122 | INFORMANT 124 |

EVENTS 126:

| INCIDENT | START DATE | END DATE | DESCRIPTION |
|---|---|---|---|
| INCIDENT A 128 | 02-01-2016 130 | 04-09-2016 132 | DESCRIPTION 134 |
| INCIDENT C 136 | 23-04-2015 138 | 16-07-2016 140 | DESCRIPTION 142 |

OBJECTS 144:

| OBJECT ID | OBJECT | DESCRIPTION |
|---|---|---|
| XYZ 148 | OBJECT S 146 | DESCRIPTION 150 |
| WRQ 154 | OBJECT T 152 | DESCRIPTION 156 |

CASE HIERARCHY FOR 1245A 158

ATTACHMENTS FOR 1245A 160

HOME
SEARCH
RECENT ITEMS

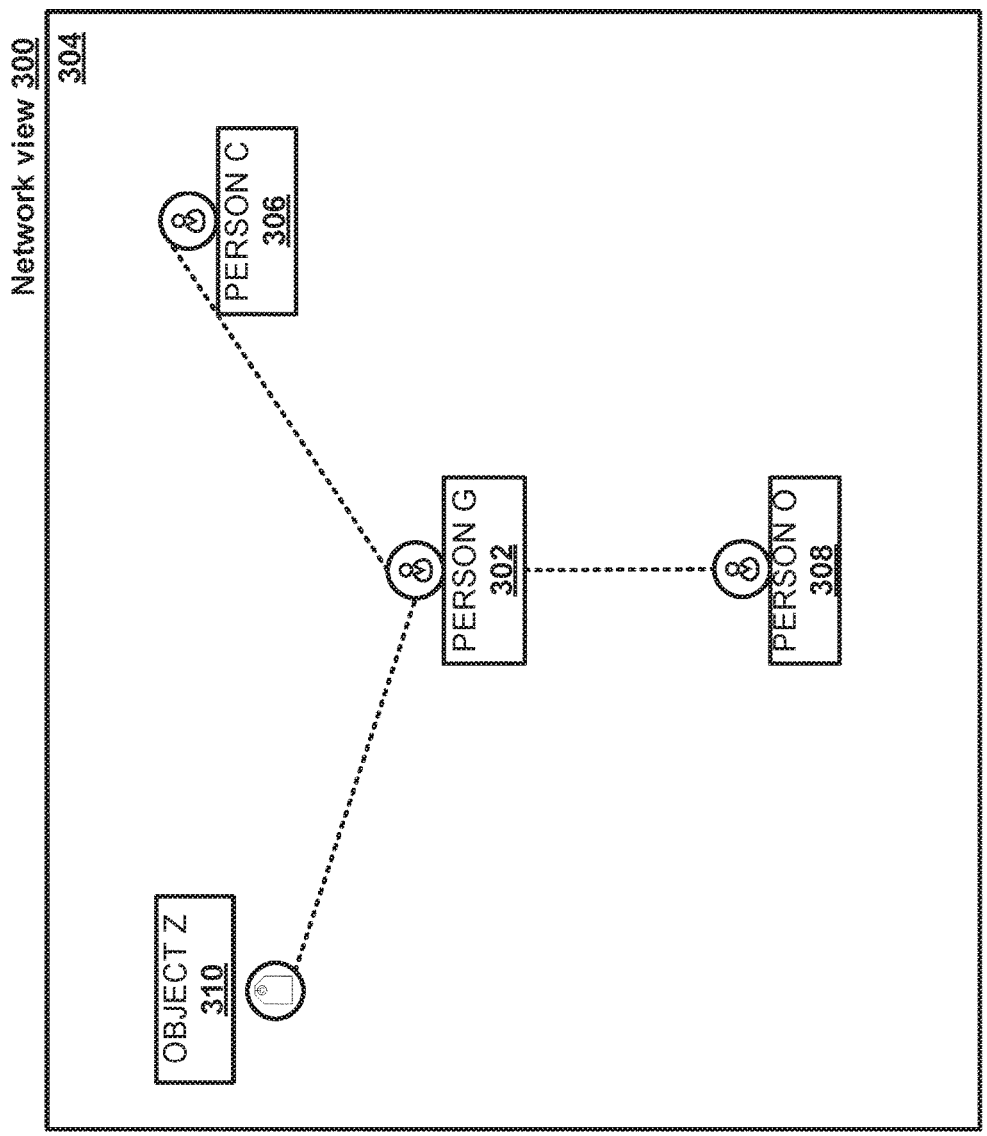
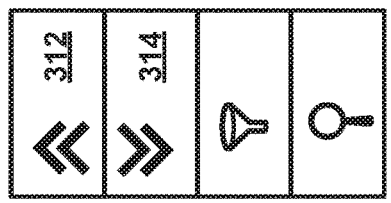
FIG. 3

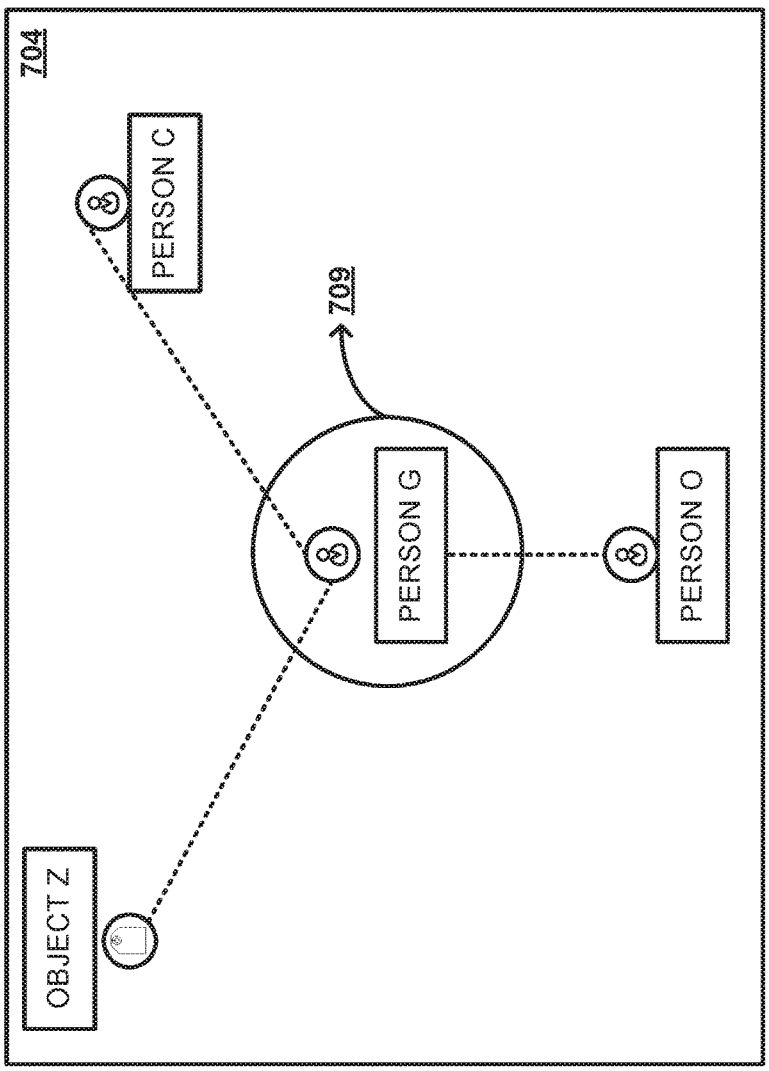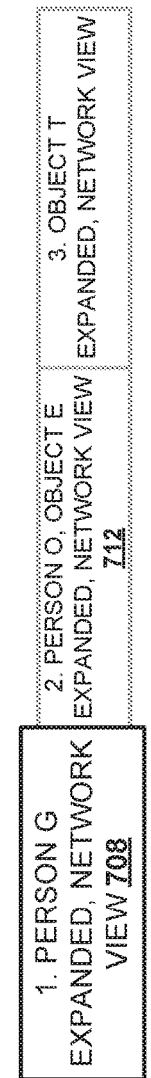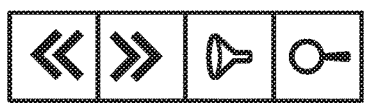
FIG. 7A

PROBING LINEAR AND NON-LINEAR RELATIONSHIPS BETWEEN ENTITIES IN A NETWORK

FIELD

Illustrated embodiments generally relate to data processing, and more particularly to probing linear and non-linear relationships between entities in a network.

BACKGROUND

Some enterprise applications related to investigation, support law enforcement authorities and other intelligence organizations during investigation of criminal activity or during enforcement of public security. In an individual case, various information associated with people, object, location, etc., are captured and stored as information pertinent to the case. The information associated with the case may be represented as nodes in a network diagram. Investigation of a new case may or may not be related to an existing case. Investigation of one case may iteratively lead to other cases. In a situation where the number of related cases is high, it is challenging to keep track of the sequence of cases that lead to one another, especially while an investigator tries to revisit the investigation.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. Various embodiments, together with their advantages, may be best understood from the following detailed description taken in conjunction with the accompanying drawings.

FIG. 1 is a graphical user interface of an investigation management application, according to one embodiment.

FIG. 3 is a network view illustrating probing of entities, according to one embodiment.

FIGS. 7A and 7B are network views illustrating previous and next of linear and non-linear entities in the network view, according to one embodiment.

DETAILED DESCRIPTION

Figure 2:
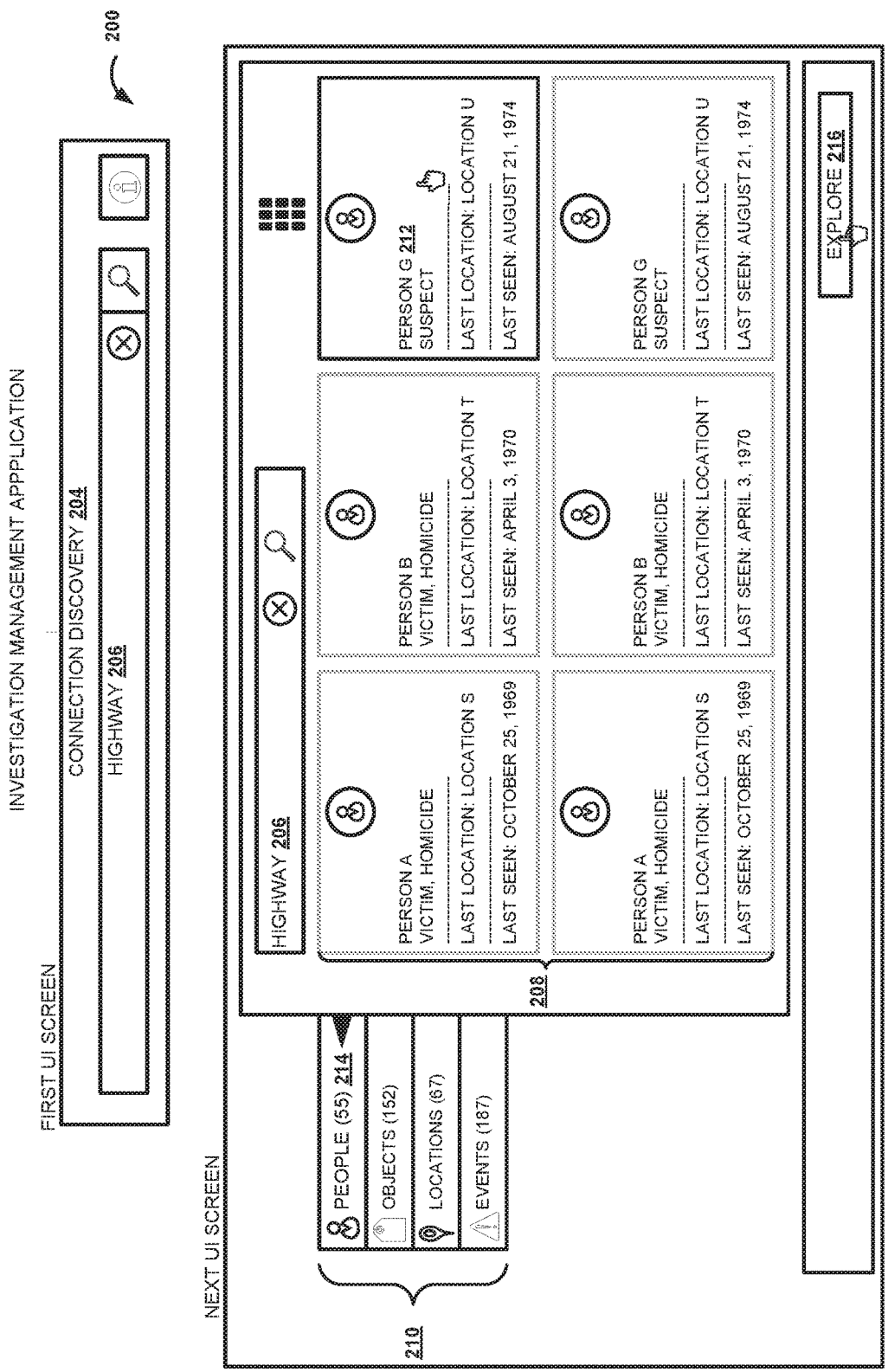
FIG. 2 is sequence of user interfaces of an investigation management application illustrating investigation of a case, according to one embodiment.

Embodiments of techniques for data processing for probing linear and non-linear relationships between entities in a network are described herein. In the following description, numerous specific details are set forth to provide a thorough understanding of the embodiments. A person of ordinary skill in the relevant art will recognize, however, that the embodiments can be practiced without one or more of the specific details, or with other methods, components, materials, etc. In some instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

FIG. 1 is graphical user interface (GUI) 100 of an investigation management application, according to one embodiment. Investigation management application allows investigators to register, secure, and maintain accurate and confidential data associated with a case/incident. When the investigator provides credentials and logs into the investigation management application, a session or login session is established and maintained for the investigator until the investigator opts to log out of the investigation management application. For example, the session may be a web session such as hypertext transfer protocol (HTTP) session. Login session is the period of time between log in and log out in the investigation management application. A case may correspond to an incident or event that requires investigation. Investigation of a case may be performed in the login session by the investigator. Entities associated with a case such as person, object, location, event, etc., may be stored along with the case.

An entity may be stored with additional information related to the case. For example, investigation case with case identifier (ID) '1245A' 102 is displayed in the investigation management application GUI 100. Locations where the case '1245A' 102 took place are stored in the locations 106 field. For example, 'location A' 108 along with address 'DEF' 110, and 'location B' 112 along with address 'BGH' 114 is stored in the locations 106 field. Similarly, people involved in the case '1245A' 102 are stored in people 116 field along with the relationships of the different people with the case. For example, 'person A' 118 is stored as 'witness' 120, and 'person B' 122 as 'informant' 124.

Events associated with the case '1245A' 102 are stored in the events field 126. For example, 'incident A' 128 with start date '02-01-2016' 130, end date '04-09-2016' 132 and description 134 is stored in the events field 126. Similarly, incident C 136 with start date '23-04-2015' 138, end date '16-07-2016' 140 and description 142 is stored in the events field 126. Objects associated with the case 1245A 102 are stored in objects field 144 for example objects as weapons associated with the case. Thus, 'object S' 146 with object identifier 'XYZ' 148 along with description 150, and 'object T' 152 with object identifier 'WRQ' 154 along with description 156 are stored in the objects field 144. Other information associated with the case such as 'case hierarchy for 1245A' 158, 'attachments for 1245A' 160, etc., are also stored in the investigation management application. Entities such as person, object, location, and event associated with the investigation case may be stored in various database tables along with unique identifiers corresponding to the entities. The details described above are merely exemplary;

other information associated with the case may be captured and stored in the investigation management application 100.

FIG. 2 is sequence of user interfaces 200 of an investigation management application illustrating investigation of a case, according to one embodiment. Investigation management application provides a connection discovery search tab 204 to explore a case. For example, input in the connection discovery search tab 204 may be case ID's, people, objects, locations, events, etc. In an example, 'Highway' 206 is provided as location input in the search tab, and search is performed. Based on the search with 'highway' 206 as input, related cases that have an association with the search location 'highway' are retrieved and displayed as shown in 208. The search results are categorized into various categories of entities 210, such as people, objects, locations and events, as shown. For example, 'person G' 212 involved in the 'highway' case may be displayed under people tab (214), etc. Likewise, an object 'car A' involved in the 'highway' case may be displayed under the objects tab.

When an investigator provides credentials and logs in to the investigation management application by establishing a login session, the investigator may choose to select a specific search result and explore or probe to investigate a case further. This investigation may be assigned a unique investigation ID and saved for later use. For example, the investigator may select a specific person such as 'person G' 212 under the people tab 214 and click on explore 216 to further explore or probe the case. The explored case details may be displayed in various views such as network view, map view, etc. Network view is a graphical representation with entities represented as nodes and the relationship between the entities represented as edges connecting the nodes. When the investigator selects 'person G' 212 and clicks on explore 216, the information associated with the 'person G' 212 may be displayed in a network view for exploration or probing.

FIG. 3 is network view 300 illustrating probing of entities, according to one embodiment. The network view of information associated with a person, e.g., 'person G' 302 is displayed in canvas 304 with one level of information. The entities are graphically represented as nodes connected by lines, here the lines represent relationships between the entities corresponding to the connected nodes in the network view. Network view can be used for displaying entities that exhibit multiple relationships at the same time. 'Person G' 302 also referred to as first node is in the center of the canvas 304, and one level of information with nodes such as 'person C' 306 and 'person O' 308 along with an object 'object Z' 310 associated with the case are displayed. The investigator may select one or more entities such as 'person C' 306, 'person O' 308 and 'object Z' 310 displayed in the canvas 304 to probe or explore further. When a specific node/entity such as 'person C' 306 is selected and expand icon 312 is clicked, the related entities are explored and displayed in the canvas 304. When the node/entity such as 'person C' 306 is explored and displayed, collapse icon 314 may be clicked so that the related entities are collapsed.

Figure 4:
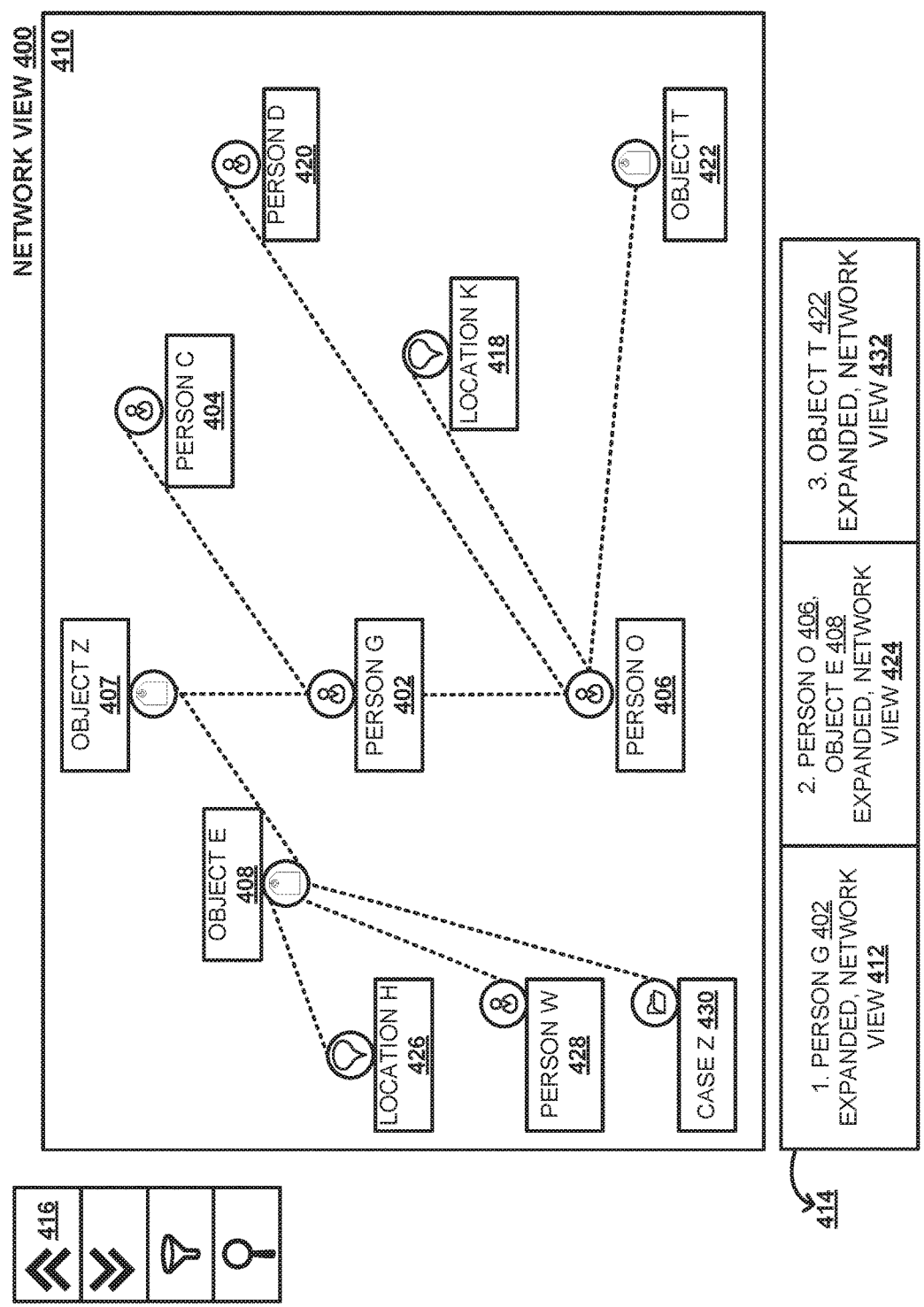
FIG. 4 is a network view illustrating linear and non-linear relationships of entities in the network view, according to one embodiment.

FIG. 4 is network view 400, e.g., in a GUI, illustrating linear and non-linear relationships of entities, according to one embodiment. In the example network view 400, first node 'person G' 402 is in the center of the canvas 410 and one level of information with nodes such as 'person C' 404 and 'person O' 406 along with 'object Z' 407 associated with the case are displayed in the canvas 410. A navigation breadcrumb 414 is generated and displayed alongside the canvas 410 in the network view. The navigation breadcrumb 414 is composed of navigation identifiers 412, 424, 432 each representing the nodes visited while probing a path in the network. The navigation breadcrumb 414 is a navigational aid in the canvas 410 that allows users to keep track of nodes visited while probing a case for investigation. In the example shown in FIG. 4, the probing of first node 'person G' 402 is represented as navigation identifier '1' 412 in the navigation breadcrumb 414. The navigation identifier '1' 412 includes information such as node selected 'person G' 402, action performed 'expanded' and view such as 'network view'. Various actions such as expand, collapse, filter, etc., may be performed on the nodes.

When node 'object Z' 407 is selected and expand icon 416 is clicked, node 'object E' 408 is displayed. The investigator may simultaneously select 'person O' 406 referred to as a second node and 'object E' 408 referred to as a third node, and click on expand icon 416 to explore the second node 'person O' 406 and the third node 'object E' 408 further. Second node 'person O' 406 is explored and one level of information with nodes such as 'location K' 418, 'person D 420' and 'object T' 422 associated with second node 'person O' 406 is displayed in the canvas 410. The third node 'object E' 408 is explored and one level of information with nodes such as 'location H' 426, 'person W' 428 and 'case Z' 430 is displayed in the canvas 410 in the graphical user interface. The simultaneous probing of the second node 'person O' 406 and the third node 'object E' 408 is represented as second navigation identifier '2' 424 in breadcrumb 414.

Subsequently, the investigator may select fourth node 'object T' 422 and click on expand icon 416 to explore (not shown) the fourth node 'object T' 422 further. The probing of the fourth node 'object T' 422 is represented as a third navigation identifier '3' 432 in breadcrumb 414. The first node 'person G' 402, the second node 'person O' 406, the third node 'object E' 408 and the fourth 'object T' 422 that were probed are captured in the navigation breadcrumb 414 as the first navigation identifier '1' 412, the second navigation identifier '2' 424, and the third navigation identifier '3' 432. The nodes may be probed in a linear path or non-linear path depending on the sequence in which nodes are selected by the investigator. Navigation from the first node 'person G' 402 to the second node 'person O' 406 is in a sequential/linear manner i.e., the first node 'person G' 402 is directly connected to the second node 'person O' 406. Such navigation of probing is referred to as linear path. Whereas, the navigation from the first node 'person G' 402 to the third node 'object E' 408, and the navigation from the third node 'object E' 408 to the fourth node 'object T' 422 are in a non-linear manner. The first node 'person G' 402 is not directly connected to the third node 'object E' 408, and the third node 'object E' 408 is not directly connected to the fourth node 'object T' 422. Such navigation of probing is referred to as non-linear path.

Figure 5A:
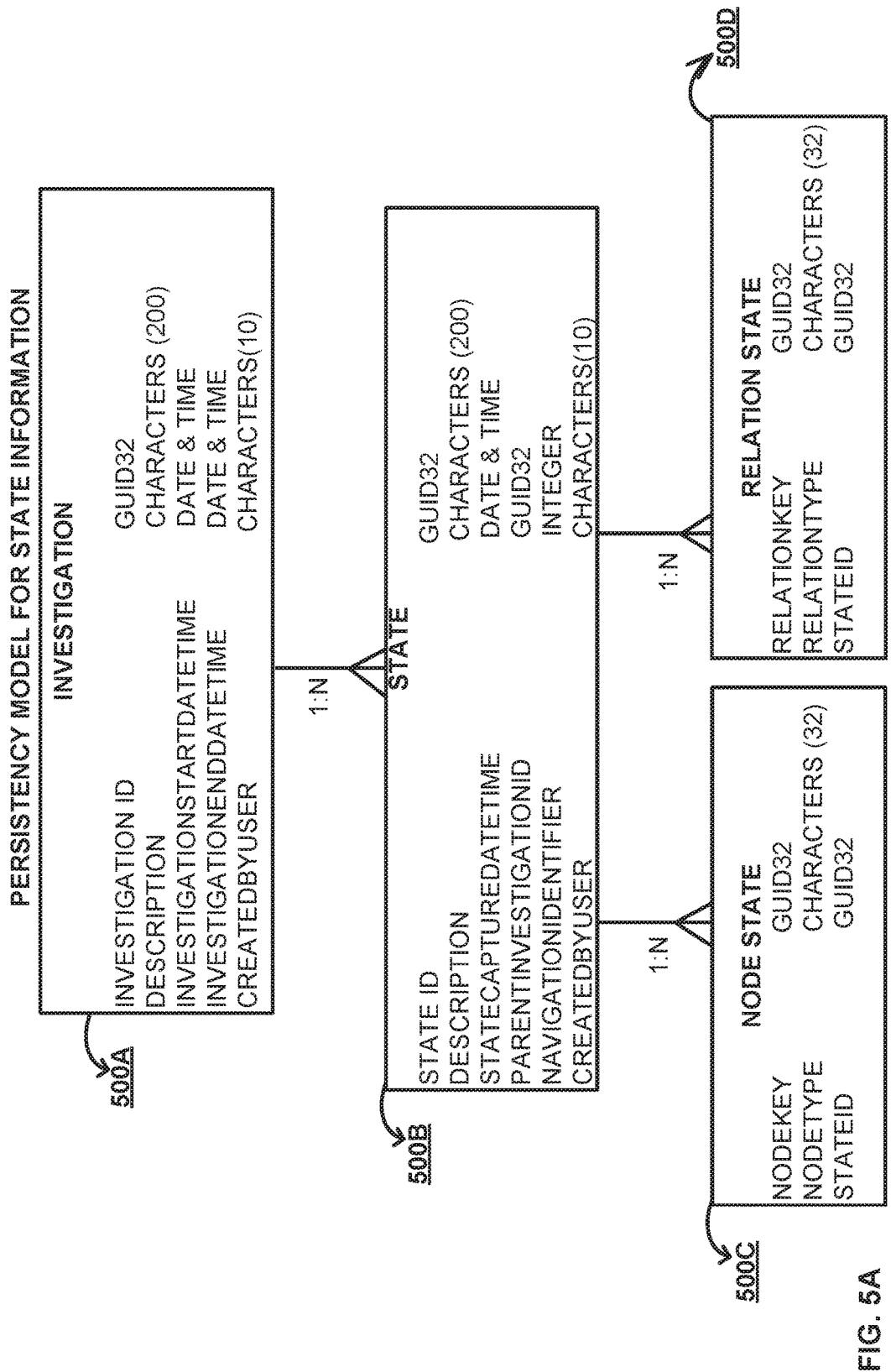
FIG. 5A is a persistency model for state information, according to one embodiment.

FIG. 5A is a persistency model for state information, according to one embodiment. As shown in FIG. 3, in a session established for an investigator, first node 'person G' 302 is in the center of the canvas and one level of information with nodes such as 'person C' 306 and 'person O' 308 along with 'object Z' 310 associated with the case are displayed in the canvas 304. Probing the first node 'person G', as shown in FIG. 4, is represented as navigation identifier 412 in the navigation breadcrumb 414. State of the nodes while probing the first node 'person G' is referred to as first state information of the nodes, and is stored in database tables based on the persistency model for state information shown in FIG. 5A.

The persistency model for investigation 500A provides information on fields and type of fields such as 'investigation ID' of type GUID, 'description' of type character, 'investigation start date time' of type date & time, 'investigation end date time' of type date & time, and 'created by user' of type character. Entities corresponding to a particular navigation identifier are referred to be in a particular state. 'State ID' may be automatically generated or user defined for a particular state. The persistency model for state 500B provides information on fields and type of fields such as 'state ID' of type GUID, 'description' of type character, 'state capture date time' of type date & time, 'parent investigation ID' of type GUID, 'navigation identifier' of type integer and the 'created by user' of type character. Similarly, persistency model for node state 500C provides information on node state such as 'node key' (GUID) representing a unique key identifying a unique node, 'node type' (character) representing a type of node and 'state ID'. Persistency model for relation state 500D of node provides information such as 'relation key' (GUID) that represents a unique relation key, 'relation type' (character) and 'state ID' (GUID).

Figure 5B:
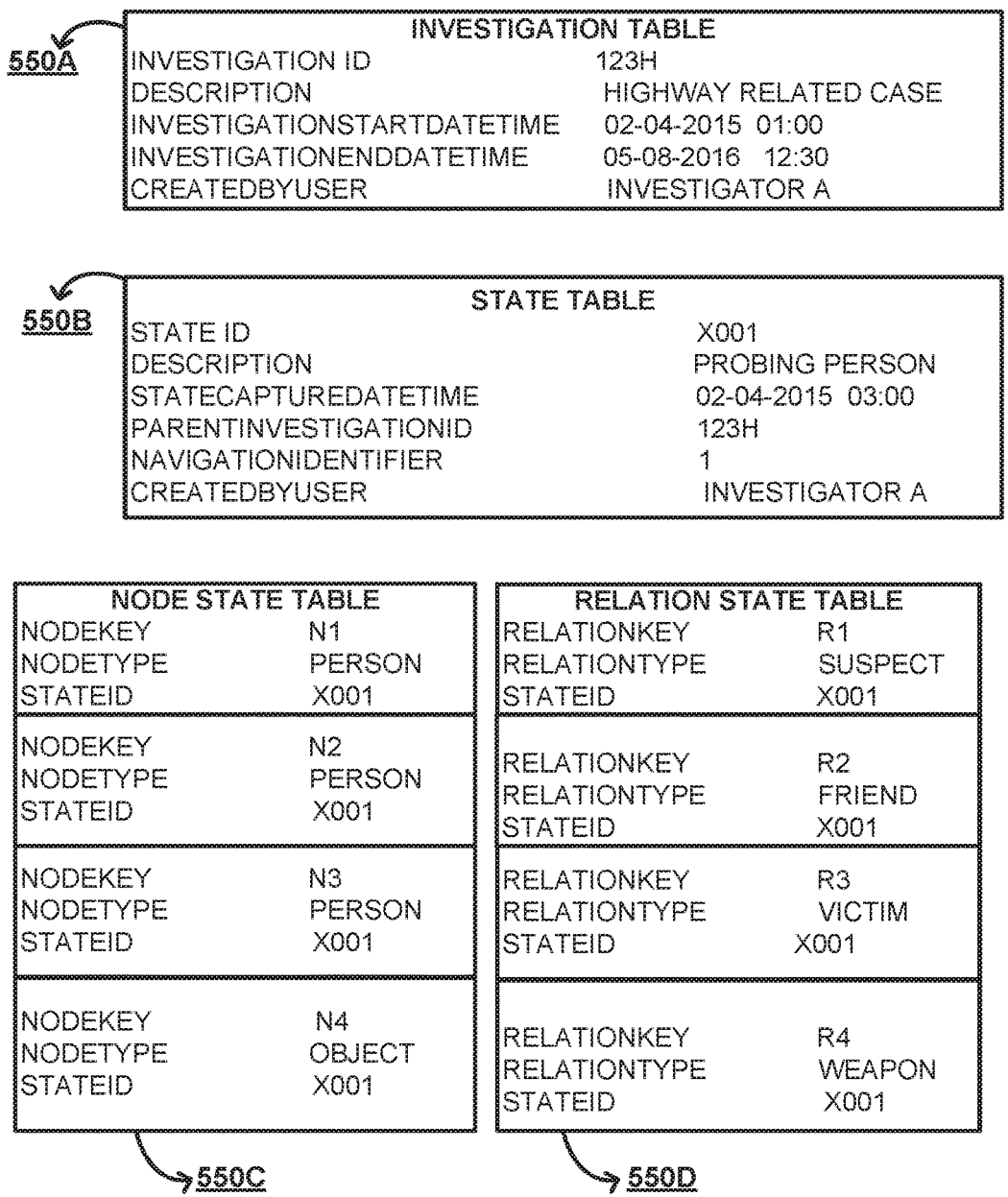
FIG. 5B is a set of database tables to persist state information, according to one embodiment.

FIG. 5B is a set of database tables to persist state information, according to one embodiment. The first state information of the nodes is stored in database tables 550A-550D. With reference to FIG. 3, based on the persistency model for state information, states associated with entities corresponding to a particular navigation identifier are stored in database tables 550A-550D. For example, with reference to FIG. 2 and FIG. 3, when 'investigator A' provides credentials and logs in to the investigation management application by establishing a login session to investigate a case, probing of nodes is captured as first state information and stored in database tables 550A-550D in FIG. 5B. The following details may be stored in investigation table 550A corresponding to the investigation case. The individual investigation initiated in FIG. 2 may be automatically assigned a unique identifier such as investigation ID '123H'. The investigation ID '123H' may be associated with description as 'highway related case', investigation start date time as '02-04-2015 01:00', investigation end date time as '05-08-2016 12:30', and the created by user as 'investigator A'. In this particular login session of 'investigator A', the probing of first node 'person G' corresponding to navigation identifier '1' 412 in navigation breadcrumb 414 in FIG. 4 is identified by a state identifier (ID). For example, for state ID 'X001', description 'probing person', state capture date time '02-04-2015 03:00', parent case ID '123H', navigation identifier '1', and created by user 'investigator A' are stored in state table 550B.

The probed first node 'person G' is stored with node key 'N1', node type as 'person' and state ID as 'X001' in node state table 550C. Similarly, when the first node 'person G' was probed, other nodes such as 'person C', 'person O' and 'object Z' were displayed. Accordingly, information on node state of nodes 'person C', 'person O' and 'object Z' are stored in the node state table 550 C. For example, information on node state of 'person C' is stored with node key 'N2', node type as 'person' and state ID as 'X001', for 'person O' is stored with node key 'N3', node type as 'person' and state ID as 'X001' and 'object Z' is stored with node key 'N4', node type as 'object' and state ID as 'X001' in node state table 550C.

The probed first node 'person G' has relation key 'R1', relation type 'suspect' and state ID 'X001' and is stored in relation state table 550D. Similarly, relation of node 'person C', 'person O' and 'object Z' are stored in the relation state table 550 D. Node 'person C' with relation key 'R2', relation type 'friend' and state ID 'X001'; node 'person O' with relation key 'R3', relation type 'victim' and state ID 'X001'; and 'object Z' with relation key 'R4', relation type 'weapon' and state ID 'X001', are stored in relation state table 550D.

According to one embodiment, state ID is the unique identifier that binds state information of nodes together. Along with this state information, additional information such as the login session of 'investigator A' may be stored. When 'investigator A' revisits the investigation management application, provides login credentials and establishes a session in the investigation management application, the first or the previous state information stored for 'investigator A' may be referenced while displaying the network view in the canvas.

State information is retrieved from database tables 550A-550D in FIG. 5B, where state information is maintained for individual investigators for individual sessions. For example, when 'investigator A' clicks on navigation identifier '1' in FIG. 4, the state ID corresponding to navigation identifier '1' is identified as 'X001'. With state ID 'X001', corresponding reference node states and relation states are retrieved from database tables 550C-550D. State information corresponding to a navigation identifier may be saved automatically or manually with additional details and/or notes pertinent to the login session for 'investigator A'.

Figure 6:
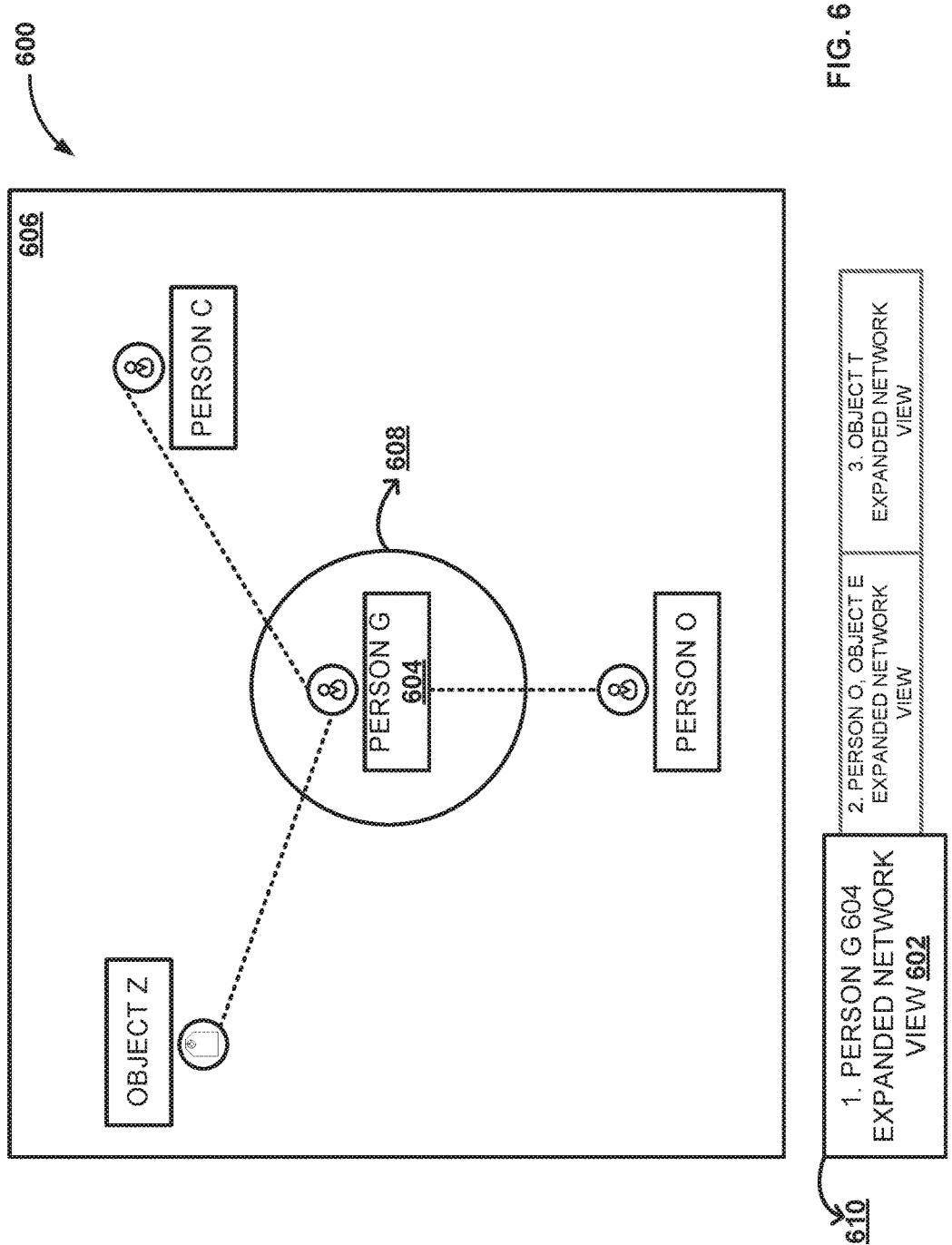
FIG. 6 is a block diagram illustrating network view of dynamic selection of a navigation identifier, according to one embodiment.

FIG. 6 is a block diagram illustrating network view 600 of dynamic selection of a navigation identifier, according to one embodiment. For example, when an investigator provides login credentials to an investigation management application, a login session is established. State information corresponding to the investigator is retrieved from a database. When the investigator, selects a navigation identifier 602, state of the nodes stored in database tables 550A-550D as shown in FIG. 5B are retrieved and displayed as shown in FIG. 6. States associated with the nodes when first node 'person G' 604 was selected is retrieved from the database tables 550A-550D and displayed in canvas 606. The first node 'person G' 604 is displayed in area of focus 608 in the canvas 606 in a graphical user interface. Even if the investigator has navigated through multiple nodes and is distant from the area of focus in the canvas 606, selection of particular navigation identifier 602, retrieves the states of the node corresponding to the navigation identifier 602, and displays in the area of focus 608 panning through the canvas 606 in the graphical user interface. Whenever a navigation identifier is selected in the navigation breadcrumb 610, states of the nodes at that particular instance when the navigation identifier was generated are retrieved and displayed. In one embodiment, if the number of navigation identifiers in the navigation breadcrumb 610 exceeds a maximum number beyond the visual portion of the graphical user interface, the navigation identifiers are displayed in smaller size to be accommodated in the visual portion of the graphical user interface. The navigation identifier currently being selected may be highlighted and/or displayed in relatively bigger size, compared to the remaining navigation identifiers, which may be displayed in smaller size. In spite of displaying the navigation identifiers in smaller size, if they exceed the visual portion of the graphical user interface, display is restricted to the number of navigation identifiers that can be accommodated in the visual portion of the graphical user interface. Restricting the navigation identifiers to the visual portion means that the remaining navigation identifiers are not displayed or not within the visual portion. As the investigator navigates the breadcrumb, the remaining navigation identifiers that were not in the visual portion are displayed.

Figure 7B:
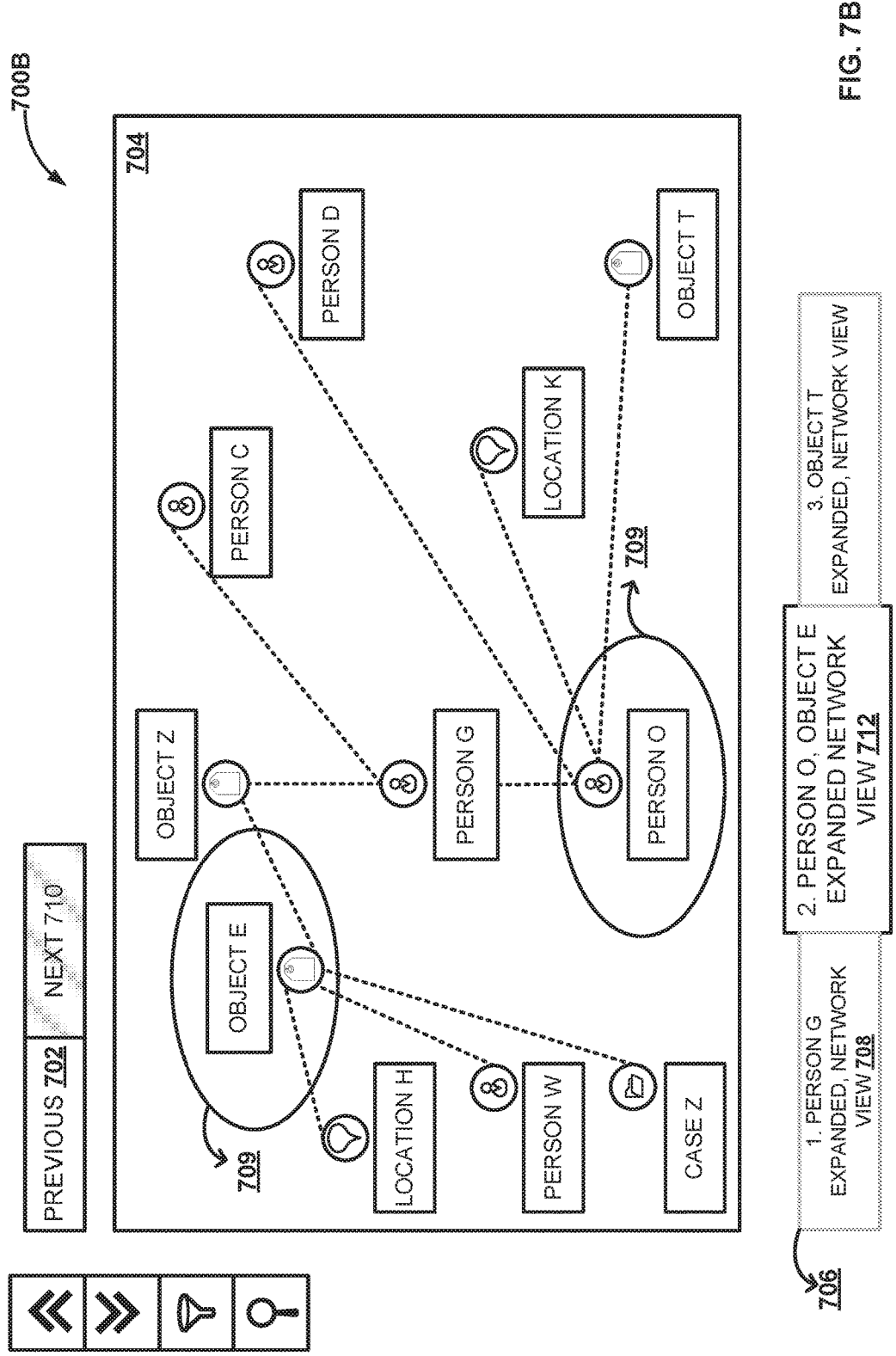

FIG. 7A is network view 700A illustrating previous navigation of linear and non-linear entities in the network view, according to one embodiment. When an investigator clicks on 'previous' 702, a previous view of the state of the nodes is retrieved from a database and displayed in canvas 704. This is equivalent to a linear navigation on navigation breadcrumb 706. For example, while a view of the state of the nodes at the instance with navigation identifier '2' 712 is currently being displayed, when an investigator clicks on 'previous' 702, linear navigation takes place, and the states of the nodes at the instance with navigation identifier '1' 708 are retrieved from the database tables in the database and displayed in the canvas 704 in area of focus 709 as shown in 700A. In another example, as illustrated in FIG. 7B, while a view of the state of the nodes at the instance with navigation identifier '1' 708 is currently being displayed, the investigator clicks on 'next' 710, the view of the states of the nodes at the instance with navigation identifier '2' 712 are retrieved from the database and displayed in the canvas 704. This is equivalent to a linear navigation on the navigation breadcrumb 706. When the investigator clicks on next 710, the second state of information corresponding to the simultaneous probing of second node 'person O' 406 and third node 'object E' 408 as explained in the context of FIG. 4, is retrieved from the database tables 550A-550D and displayed as shown in FIG. 7B.

The investigator may also use the navigation identifiers in the navigation breadcrumb 706 to navigate to the corresponding states of the nodes. The state of nodes corresponding to a particular navigation identifier is saved automatically while the investigator probes the network. In one embodiment, the investigator may choose to save the state of nodes corresponding to a particular navigation identifier along with additional details or notes. For example, states of nodes corresponding to navigation identifier '2' 712 may be saved with additional notes with explanation such as 'person G prime suspect' pertaining to the states of nodes corresponding to navigation identifier '2' 712.

Generating navigation identifiers in the navigation breadcrumb helps an investigator to retrace the investigation path in the graphical user interface more easily. Navigation identifiers generated on the navigation breadcrumb provides visual convenience to probe linear and non-linear nodes in a network in the graphical user interface. A series of non-sequentially ordered actions may be captured and represented in a sequential manner in the navigation breadcrumb. Presenting navigation identifiers in the generated navigation breadcrumb helps users to go back and forth, view, compare, and probe the network.

Figure 8:
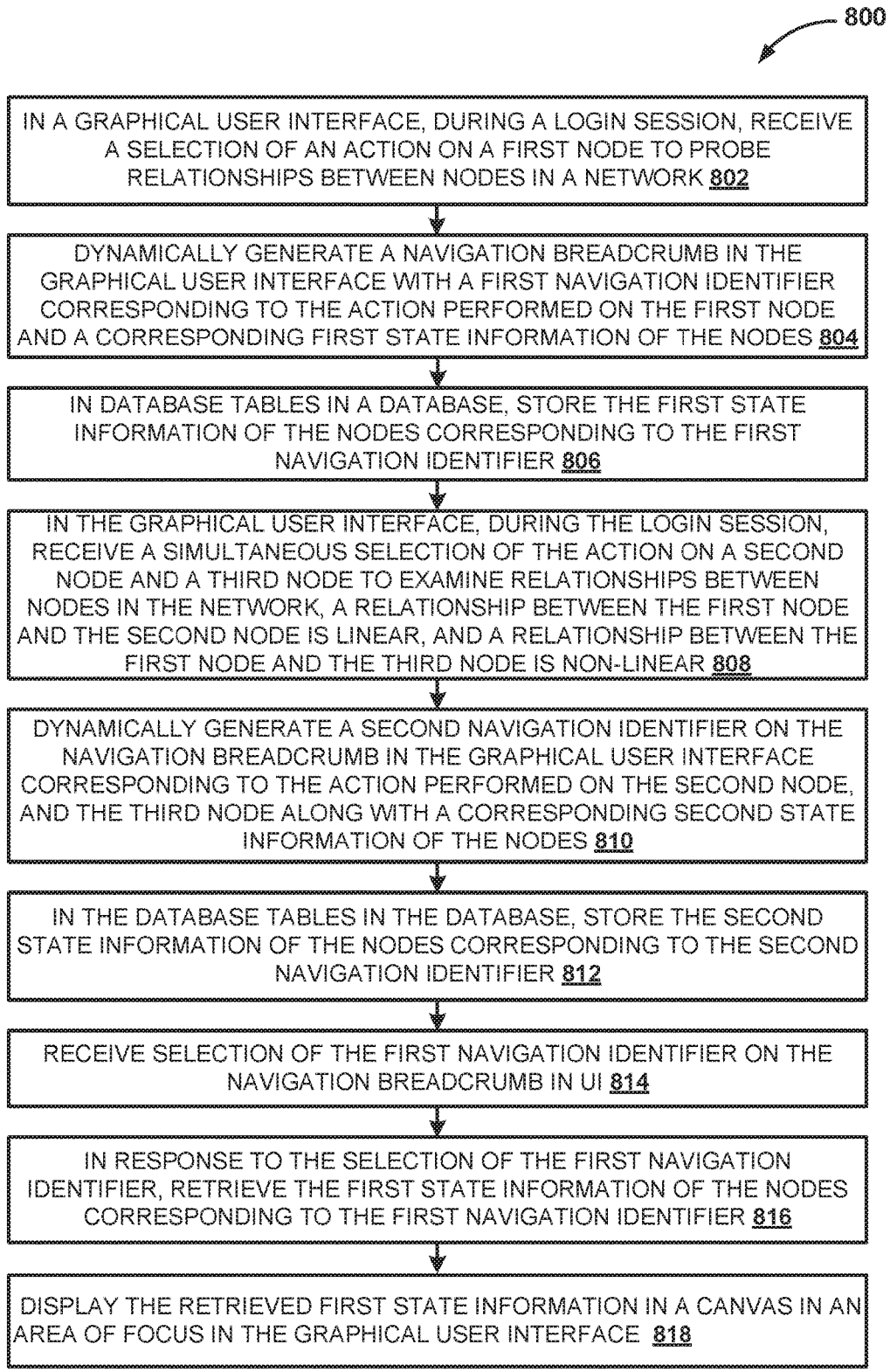
FIG. 8 is a flow chart, illustrating process of probing linear and non-linear relationships between entities in a network, according to one embodiment.

FIG. 8 is flow chart illustrating process 800 of probing linear and non-linear relationships between entities in a network, according to one embodiment. At 802, in a graphical user interface, during a login session, a selection of an action on a first node is received to probe relationships between nodes in a network, where the nodes represent entities. For example, an investigator provides login credentials to login to an investigation management application to establish a login session. The investigator may select a first node 'person G' 212 and click on explore, to further explore or probe the case as shown in FIG. 2. In response to receiving the selection, the action on the first node is automatically performed. For example, when the investigator selects the first node 'person G' 212 and clicks on expand icon, information associated with the first node 'person G' 212 is displayed in a network view. At 804, a navigation breadcrumb is dynamically generated in the graphical user interface with a first navigation identifier corresponding to the action performed on the first node and a corresponding first state information of the nodes associated with first node.

For example, the probing of first node 'person G' is represented as navigation identifier '1' in breadcrumb as shown in FIG. 4. At 806, in database tables in a database, the first state information of the nodes corresponding to the first navigation identifier is stored. For example, the first state information of the nodes corresponding to the first navigation identifier is stored in the database tables 550A-550D as shown in FIG. 5B.

At 808, in the graphical user interface, during the login session, simultaneous selection of the action on a second node and a third node is received to examine relationships between nodes in the network. A relationship between the first node and the second node is linear, and a relationship between the first node and the third node is non-linear. For example, as explained in FIG. 4, the investigator may simultaneously select 'person O' 406 referred to as a second node and 'object E' 408 referred to as a third node, and click on expand icon 416 to explore the second node 'person O' 406 and the third node 'object E' 408. At 810, a second navigation identifier is dynamically generated on the navigation breadcrumb in the graphical user interface corresponding to the action performed on the second node and the third node along with corresponding second state information of the nodes. For example, as shown in FIG. 4, the simultaneous probing of the second node 'person O' 406 and the third node 'object E' 408 is represented as second navigation identifier '2' 424 in breadcrumb 414. At 812, in the database tables in the database, the second state information of the nodes corresponding to the second navigation identifier is stored.

At 814, selection of the first navigation identifier on the navigation breadcrumb is received in a canvas in the graphical user interface. For example, the first navigation identifier may be selected as shown in FIG. 6. At 816, in response to the selection of the first navigation identifier, the first state information of the nodes corresponding to the first navigation identifier is retrieved from the database tables. For example, the first state information of the nodes corresponding to the first navigation identifier is retrieved from the database tables as shown in FIG. 6. At 818, the retrieved first state information is displayed in a canvas in an area of focus in the graphical user interface.

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits (ASICs), programmable logic devices (PLDs) and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 9:
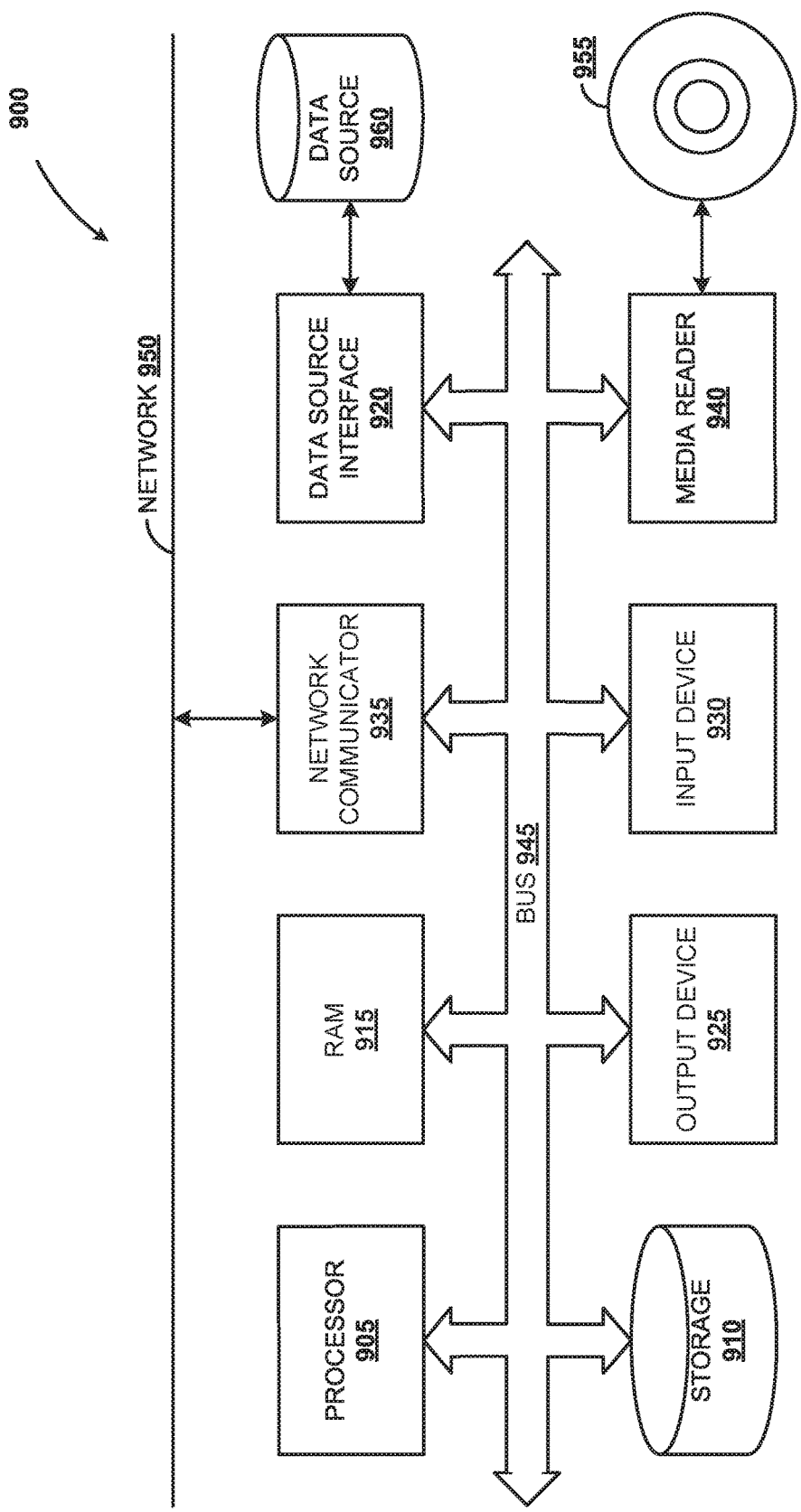
FIG. 9 is a block diagram of an exemplary computer system, according to one embodiment.

FIG. 9 is a block diagram of an exemplary computer system 900. The computer system 900 includes a processor 905 that executes software instructions or code stored on a computer readable storage medium 955 to perform the above-illustrated methods. The computer system 900 includes a media reader 940 to read the instructions from the computer readable storage medium 955 and store the instructions in storage 910 or in random access memory (RAM) 915. The storage 910 provides a large space for keeping static data where at least some instructions could be stored for later execution. The stored instructions may be further compiled to generate other representations of the instructions and dynamically stored in the RAM 915. The processor 905 reads instructions from the RAM 915 and performs actions as instructed. According to one embodiment, the computer system 900 further includes an output device 925 (e.g., a display) to provide at least some of the results of the execution as output including, but not limited to, visual information to users and an input device 930 to provide a user or another device with means for entering data and/or otherwise interact with the computer system 900. Each of these output devices 925 and input devices 930 could be joined by one or more additional peripherals to further expand the capabilities of the computer system 900. A network communicator 935 may be provided to connect the computer system 900 to a network 950 and in turn to other devices connected to the network 950 including other clients, servers, data stores, and interfaces, for instance. The modules of the computer system 900 are interconnected via a bus 945. Computer system 900 includes a data source interface 920 to access data source 960. The data source 960 can be accessed via one or more abstraction layers implemented in hardware or software. For example, the data source 960 may be accessed by network 950. In some embodiments the data source 960 may be accessed via an abstraction layer, such as a semantic layer.

A data source is an information resource. Data sources include sources of data that enable data storage and retrieval. Data sources may include databases, such as relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A non-transitory computer-readable medium to store instructions, which when executed by a computer, cause the computer to perform operations comprising:
    in a graphical user interface, during a session within which a particular user is logged in and prior to the particular user logging out, receive a selection of an action on a first node among a plurality of nodes, the selection of the first node used to probe relationships between nodes in a network, wherein each of the plurality of nodes represent an entity;
    dynamically generate a navigation breadcrumb presented visually in the graphical user interface, the navigation breadcrumb comprising a first navigation identifier corresponding to the action performed on the first node and a corresponding first state information of all the nodes in the plurality of nodes; and
    in database tables in a database, store the first state information of the nodes corresponding to the first navigation identifier.

2. The computer-readable medium of claim 1, further comprises instructions which when executed by the computer further cause the computer to:
   in the graphical user interface, during the session within which a particular user is logged in and prior to the particular user logging out, receive a simultaneous selection of the action on a second node and a third node to examine relationships between nodes in the network, wherein a relationship between the first node and the second node is linear, and a relationship between the first node and the third node is non-linear;
   dynamically generate a second navigation identifier on the navigation breadcrumb in the graphical user interface corresponding to the action performed on the second node and the third node, and a corresponding second state information of all the nodes in the plurality of nodes; and
   in the database tables in the database, store the second state information of the nodes corresponding to the second navigation identifier.

3. The computer-readable medium of claim 1, further comprises instructions which when executed by the computer further cause the computer to:
   receive selection of the first navigation identifier on the navigation breadcrumb in the graphical user interface;
   in response to the selection of the first navigation identifier, retrieve the first state information of the nodes corresponding to the first navigation identifier from the database tables; and
   display the retrieved first state information in a canvas in an area of focus in the graphical user interface.

4. The computer-readable medium of claim 1, further comprises instructions which when executed by the computer further cause the computer to:
   display a retrieved third state information in the canvas in the area of focus in the graphical user interface;
   receive selection on a previous button in the canvas in the graphical user interface
   in response to the selection of the previous button, retrieve the second state information of the nodes corresponding to the second navigation identifier from the database tables in the database; and
   display the retrieved second state information in the canvas in the area of focus in the graphical user interface.

5. The computer-readable medium of claim 1, further comprises instructions which when executed by the computer further cause the computer to:
   display the navigation breadcrumb including the first navigation identifier, the second navigation identifier and the third navigation identifier in a sequence in the graphical user interface.

6. The computer-readable medium of claim 1, further comprises instructions which when executed by the computer further cause the computer to:
   display the navigation breadcrumb with the first navigation identifier highlighted in response to selection of the first navigation identifier.

7. The computer-readable medium of claim 1, wherein the database tables include a state table, a node state table, and a relation state table corresponding to the first state information of the nodes.

8. A computer-implemented method of probing linear and non-linear relationships of entities in a network, the method comprising:
   in a graphical user interface, during a session within which a particular user is logged in and prior to the particular user logging out, receiving a selection of an action on a first node among a plurality of nodes, the selection of the first node used to probe relationships between nodes in a network, wherein each of the plurality of nodes represents an entity;
   dynamically generating a navigation breadcrumb presented visually in the graphical user interface, the navigation breadcrumb comprising a first navigation identifier corresponding to the action performed on the first node and a corresponding first state information of all the nodes in the plurality of nodes; and
   in database tables in a database, storing the first state information of the nodes corresponding to the first navigation identifier.

9. The method of claim 8, further comprising:
   in the graphical user interface, during the session within which a particular user is logged in and prior to the particular user logging out, receiving a simultaneous selection of the action on a second node and a third node to examine relationships between nodes in the network, wherein a relationship between the first node and the second node is linear, and a relationship between the first node and the third node is non-linear;
   dynamically generating a second navigation identifier on the navigation breadcrumb in the graphical user interface corresponding to the action performed on the second node and the third node, and a corresponding second state information of all the nodes in the plurality of nodes; and
   in database tables in the database, store the second state information of the nodes corresponding to the second navigation identifier.

10. The method of claim 8, further comprising:
    receiving selection of the first navigation identifier on the navigation breadcrumb in the graphical user interface;
    in response to the selection of the first navigation identifier, retrieving the first state information of the nodes corresponding to the first navigation identifier from the database tables in the database; and
    displaying the retrieved first state information in a canvas in an area of focus in the graphical user interface.

11. The method of claim 8, further comprising:
    displaying a retrieved third state information in the canvas in the area of focus in the graphical user interface;
    receiving selection on a previous button in the canvas in the graphical user interface;
    in response to the selection of the previous button, retrieve the second state information of the nodes corresponding to the second navigation identifier from the database tables in the database; and
    displaying the retrieved second state information in the canvas in the area of focus in the graphical user interface.

12. The method of claim 8, further comprising:
    displaying navigation breadcrumb includes the first navigation identifier, the second navigation identifier and the third navigation identifier in a sequence in the graphical user interface.

13. The method of claim 8, further comprising:
    displaying the navigation breadcrumb with the first navigation identifier highlighted in response to selection of the first navigation identifier.

14. The method of claim 8, wherein the database tables include a state table, a node state table, and a relation state table corresponding to the first state information of the nodes.

15. A computer system for probing linear and non-linear relationships of entities in a network, comprising:
   a computer memory to store program code; and
   a processor to execute the program code to:
   in a graphical user interface, in a session during which a particular user is logged in and prior to the particular user logging out, receive a selection of an action on a first node among a plurality of nodes, the selection of the first not used to probe relationships between nodes in a network, wherein each of the plurality of nodes represents an entity;
   in response to the selection of the action on the first node, automatically perform the action on the first node;
   dynamically generate a navigation breadcrumb presented visually in the graphical user interface, the navigation breadcrumb comprising a first navigation identifier corresponding to the action performed on the first node and a corresponding first state information of all the nodes in the plurality of nodes; and
   in database tables in a database, store the first state information of the nodes corresponding to the first navigation identifier.

16. The system of claim 15, wherein the processor further executes the program code to:
   in the graphical user interface, during the session within which a particular user is logged in and prior to the particular user logging out, receive a simultaneous selection of the action on a second node and a third node to examine relationships between nodes in the network, wherein a relationship between the first node and the second node is linear, and a relationship between the first node and the third node is non-linear;
   dynamically generate a second navigation identifier on the navigation breadcrumb in the graphical user interface corresponding to the action performed on the second node and the third node, and a corresponding second state information of all the nodes in the plurality of nodes; and
   in the database tables in the database, store the second state information of the nodes corresponding to the second navigation identifier.

17. The system of claim 15, wherein the processor further executes the program code to:
   receive selection of the first navigation identifier on the navigation breadcrumb in the graphical user interface;
   in response to the selection of the first navigation identifier, retrieve the first state information of the nodes corresponding to the first navigation identifier from the database tables; and
   display the retrieved first state information in a canvas in an area of focus in the graphical user interface.

18. The system of claim 15, wherein the processor further executes the program code to:
   display a retrieved third state information in the canvas in the area of focus in the graphical user interface;
   receive selection on a previous button in the canvas in the graphical user interface in response to the selection of the previous button, retrieve the second state information of the nodes corresponding to the second navigation identifier from the database tables in the database; and
   display the retrieved second state information in the canvas in the area of focus in the graphical user interface.

19. The system of claim 15, wherein the processor further executes the program code to:
   display the navigation breadcrumb including the first navigation identifier, the second navigation identifier and the third navigation identifier in a sequence in the graphical user interface.

20. The system of claim 15, wherein the processor further executes the program code to:
   display the navigation breadcrumb with the first navigation identifier highlighted in response to selection of the first navigation identifier.

* * * * *